G. Utley.
102336
*Wrench.*
PATENTED APR 26 1870
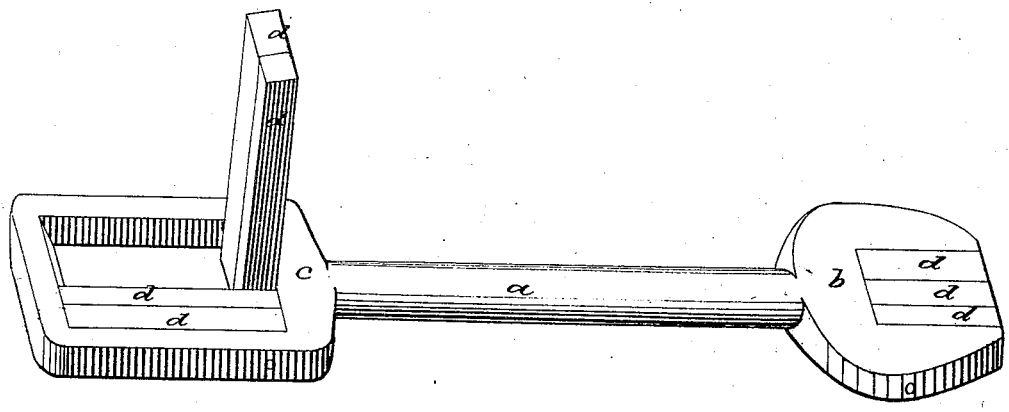
Witnesses:
Victor Hagmann
Solon C. Kemon
Inventor:
G. Utley
per Munn & Co
Attorneys.

United States Patent Office.

GABRIEL UTLEY, OF CHAPEL HILL, NORTH CAROLINA.

Letters Patent No. 102,336, dated April 26, 1870.

IMPROVEMENT IN WRENCHES.

The Schedule referred to in these Letters Patent and making part of the same.

*To all whom it may concern:*

Be it known that I, GABRIEL UTLEY, of Chapel Hill, in the county of Orange and State of North Carolina, have invented a new and improved Wrench; and I do hereby declare that the following is a full, clear, and exact description of the same, reference being had to the accompanying drawings making a part of this specification, in which the figure is a perspective view of my wrench, showing some of the fingers closed and others of them open.

This invention has for its object the ready adjustment of a hand-wrench to a nut of any size, without the use of a screw.

The invention consists of fingers of different widths all jointed on one pivot within the forked end or closed frame of the wrench, by means of which such part of the inclosed space as is not occupied by the nut may be filled with one or more of the fingers.

In the drawings—

*a* the handle, *b* the forked end, and *c* a closed frame on the opposite end of a wrench.

*d d*, &c., are fingers, all pivoted side by side on wires placed transversely of the parts *b c*, said fingers being of different widths, and filling the frame *c* and the space between the forks *b*, when all are turned down together.

By turning down one or more of the fingers *d* the width of the space between the forks and of that between the sides of the frame *c* is accommodated to nuts of different dimensions in a very easy and simple manner.

Having thus described my invention,

What I claim as new, and desire to secure by Letters Patent, is—

The combination of a hand-wrench with adjustable fingers, substantially in the manner described, and for the purpose set forth.

GABRIEL UTLEY.

Witnesses:
   J. M. ALEXANDER,
   PRIDE JONES.